June 23, 1942.  T. W. HALLERBERG  2,287,241
INDICATOR
Filed Sept. 14, 1940   2 Sheets-Sheet 1
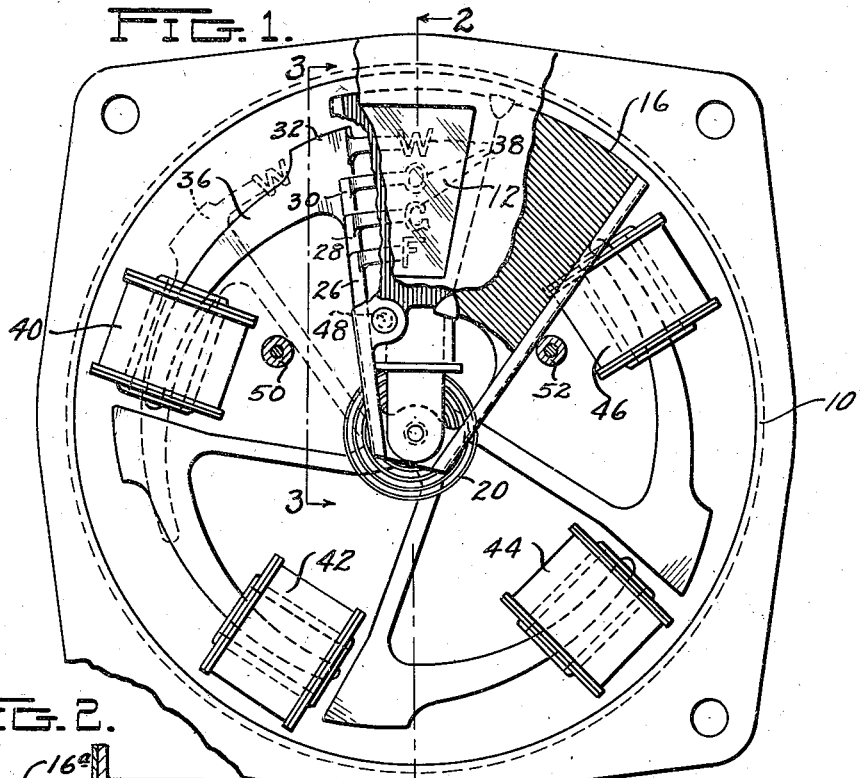
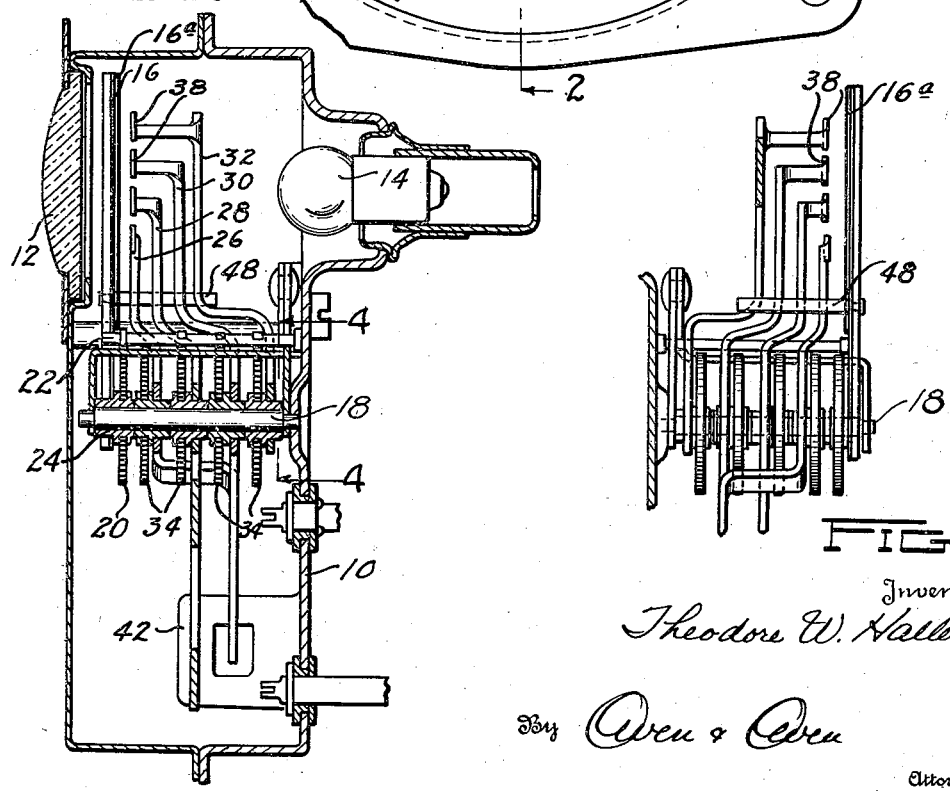
Inventor
Theodore W. Hallerberg
By Owen & Owen
Attorneys June 23, 1942. T. W. HALLERBERG 2,287,241
INDICATOR
Filed Sept. 14, 1940 2 Sheets-Sheet 2
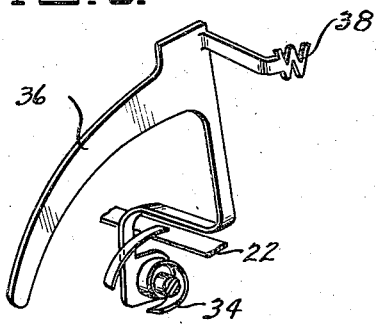
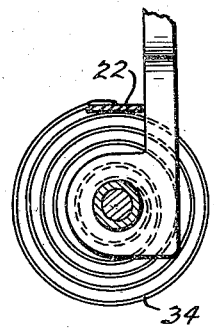
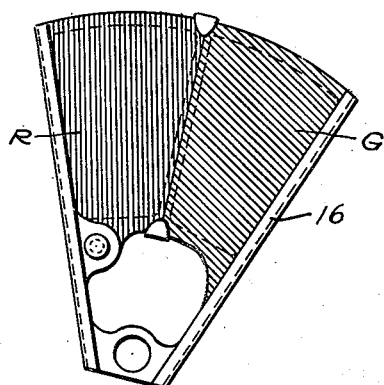
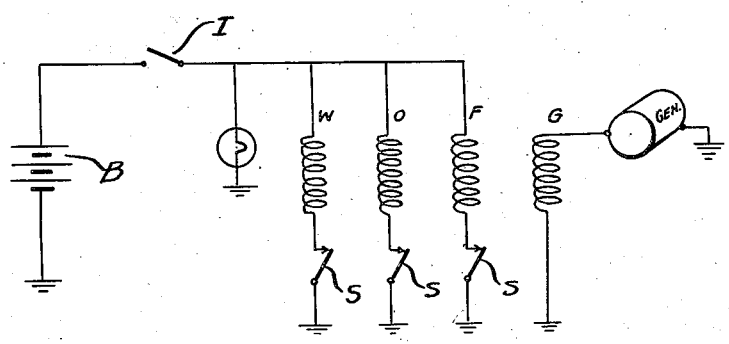
Inventor
Theodore W. Hallerberg
By Oren & Oren
Attorneys Patented June 23, 1942

2,287,241

UNITED STATES PATENT OFFICE 2,287,241

INDICATOR

Theodore W. Hallerberg, Chicago, Ill.

Application September 14, 1940, Serial No. 356,810

3 Claims. (Cl. 177—327)

This invention relates to indicating apparatus and is particularly directed to apparatus for use on automotive vehicles to indicate the condition of various vital parts of the vehicle. The instrument is intended to replace the several calibrated gauges now commonly used.

In my prior Patent No. 2,053,826, issued September 8, 1936, there is disclosed an apparatus of the general type embodying a telltale indicator and "source" indicators for each of certain parts of the vehicle, such as the generator, water temperature, oil pressure, etc. The arrangement is such that when all of the components are functioning properly, a subdued green light is displayed to the operator, but when one or more of the components becomes defective, as when the oil pressure drops to a dangerously low level, a bright red warning light is displayed.

In the present invention I have improved the apparatus to make it more convenient for the operator and have eliminated the separate source indicator lights and lenses.

It is the primary object of the present invention to provide an apparatus with which the operator of an automotive vehicle can tell at a glance what is wrong with the vehicle when his attention is directed to the bright red warning signal displayed.

Another object of the invention is to provide a semaphore for an instrument of this character so mounted as to stand normally in one position, but movable from that position by any of a plurality of actuating devices.

Other objects and advantages of the invention will become apparent as the description proceeds, reference being had to the accompanying drawings in which:

Fig. 1 is a front elevation with parts broken away of an indicator embodying the present invention; Fig. 2 is a section on line 2—2 of Fig. 1; Fig. 3 is a section on line 3—3 of Fig. 1; Fig. 4 is a section on line 4—4 of Fig. 2; Fig. 5 is a detail of one of the armatures and its associated indicia; Fig. 6 is a detail of the semaphore, and Fig. 7 is a circuit diagram.

Referring to the drawings, the indicator includes a cylindrical housing 10, the front face of which is opaque except for a small lens 12. A lamp 14 is seated at the rear of the housing and is directly aligned with the lens 12.

A pivoted semaphore 16 is provided and is journaled on a stud 18 which projects from the rear of the housing so that the upper portion of the semaphore lies between the lamp 14 and the lens 12. As shown in Fig. 6, the semaphore is composed of a frame in which two colored filters R and G are fixed, R being red and G being green. The colored filters may be made of any suitable material but are desirably light in weight and each is backed by a light diffusing screen such as a piece of frosted Celluloid 16a. A coil spring 20 is provided to urge the semaphore about the stud 18 in a counterclockwise direction in Fig. 1, in which position the green filter is interposed between the lamp and the lens. The spring is attached in any suitable manner although, as shown in Fig. 2 the preferred construction is such that one end of the spring is attached to a stationary rod element 22 and the other end to a collar 24 which carries the semaphore body.

Also journaled on similar collars about the stud 18 are a plurality of armatures 26, 28, 30 and 32, each of which is urged in a clockwise direction in Fig. 1, opposite to the direction in which the semaphore is urged, by associated coil springs 34. The coil springs 34 are fixed at one end to the rod element 22 and at the other end to the collars carrying the several armatures.

As shown in Fig. 5, each armature includes an arcuate end member 36 and each armature carries as a projection from an arm thereof a letter 38 which is used to designate the particular instrumentality with which the armature is associated. As shown in Figs. 2 and 3, the distance of the projection of the letters associated with the several armatures is such that they lie in a common plane immediately behind the semaphore. The angularity between the arcuate portion and the arm of each armature is determined by the fact that each arcuate part works with its own solenoid and yet the arms must be aligned when in either extreme position.

Solenoids 40, 42, 44 and 46 are fixed to the rear wall of the housing 10 and each solenoid is associated with one of the armatures so that, when energized, the respective armatures are attracted into the center of the solenoids and assume positions similar to the dotted line positions shown for armature 32 in Fig. 1. It will be noted that when in this position the armature is withdrawn from the path of the light rays entering the lens so that the letter carried thereby would not be visible to the operator of the vehicle. When all of the armatures are drawn in by their associated solenoids, all of the letters lie in such a position that they are not visible through the lens 12. At this time the spring 20 which is associated with the semaphore moves the semaphore in a path to follow the various armatures, counterclockwise in Fig. 1, so that the green filter is interposed behind the lens 12. The force exerted by the spring 20 is less than the force exerted by any of the springs 34, so that upon release of any armature by its associated solenoid the armature will move back to its normal position between the lamp and lens and will carry with it the semaphore so that the red filter moves behind the lens. In this connection it will be noted that an arm 48 (Figs. 2 and 3) is carried by the semaphore in the path of all of the armatures so that movement of any armature in a clockwise direction in Fig. 1 will cause similar movement of the semaphore.

Appropriate stop members 50 and 52 are provided to limit the swinging movement of the parts either under the influence of the several solenoids or under the influence of the associated springs.

In operation each solenoid is connected in a separate parallel sub-circuit as shown in Fig. 7, the battery of the vehicle indicated at B and the ignition switch indicated at I are interposed in the circuits so as to limit energization of the solenoids to that period when the vehicle is actually in operation. Switches S in each of the solenoid circuits are responsive to the conditions existing in that circuit, for instance, the switch in the circuit W, which indicates water temperature, is a thermally operated type responsive to the temperature of the water. The switch in the circuit designated O, for oil pressure, is a pressure responsive type and the switch F, indicating fuel, may be float operated and set to open when the fuel level is reduced to a predetermined point. The generator circuit G in Fig. 7 is connected to the generator in such a manner that should the generator cease to function, no current will flow in the associated solenoid and the armature is returned under the influence of its spring. In the instance of vehicles equipped with voltage controlled cut-out equipment, the connection will be made on the generator side of the cut-out so that the true condition of the generator will be indicated and not the condition of the circuit under the influence of the cut-out.

In operation, assuming the ignition switch I is closed and all of the parts are functioning properly, all of the solenoids will be energized and all of the armatures will be drawn into a position corresponding to the position shown in dotted lines in Fig. 1 for the armature 36. At this time the semaphore is free to move counterclockwise under the influence of its spring and to interpose the green filter between the lamp and lens. In the event that any of the solenoids should become de-energized for any reason whatever, its associated armature moves back under the influence of its spring and carries the semaphore with it. The semaphore thus interposes the red filter so that a bright red light is displayed and the letter carried by the end of the armature which caused the semaphore to move is clearly displayed in silhouette behind the lens. The attention of the operator is immediately attracted to the bright red light and a glance at the light will tell him which of the various units has ceased to function or is functioning improperly.

While the invention has been disclosed in connection with an indicator used to check water temperature, oil pressure, generator condition and fuel level, it will be appreciated that any other vital part of the vehicle may be checked by the interposition of a suitable switch in a solenoid circuit. Various modifications and changes will suggest themselves to those skilled in the art and such modifications and changes may be made without departing from the invention as defined in the appended claims.

What I claim as new and desire to secure by United States Letters Patent is:

1. In an indicator of the class described, a movable translucent color screen having a plurality of differently colored sections, a plurality of independently movable armatures, each armature carrying indicia, a solenoid associated with each armature, a light source, means normally urging the color screen in one direction so as to bring one of the color sections in front of the light source, means urging said armatures in the opposite direction, each solenoid when energized drawing its respective armature out of the position to which it is urged, means carried by the color screen in position to be engaged by any one of the armatures when its respective solenoid has been de-energized and thus to move the color screen so as to move said one color section out of position and bring another color section in front of the light source, said armature urging means being sufficiently strong to overcome the color screen urging means, and said indicia being moved to a position in line with the light source and said color screen only in the deenergized condition of the solenoid whereby the particular armature which has caused said color screen to be moved may be identified.

2. In an indicator of the class described, a pivoted translucent color screen having a plurality of differently colored sections, a plurality of independently pivoted armatures, each armature carrying indicia, a solenoid associated with each armature, a light source, means normally urging the color screen in one direction so as to bring one of the color sections in front of the light source, means urging said armatures in the opposite direction, each solenoid when energized drawing its respective armature out of the position to which it is urged, means carried by the color screen in position to be engaged by any one of the armatures when its respective solenoid has been de-energized and thus to move the color screen so as to move said one color section out of position and bring another color section in front of the light source, said armature urging means being sufficiently strong to overcome the color screen urging means, and said indicia being moved to a position in line with the light source and said color screen only in the de-energized condition of the solenoid whereby the particular armature which has caused said color screen to be moved may be identified.

3. An indicator of the class described, including a shaft, a translucent color screen having a plurality of differently colored sections pivoted on said shaft, a plurality of armatures independently pivoted on said shaft, each armature carrying indicia, a solenoid associated with each armature, a light source, means normally urging the color screen in one direction so as to bring one of the color sections in front of the light source, means urging said armatures in the opposite direction, each solenoid when energized drawing its respective armature out of the position to which it is urged, means carried by the color screen in position to be engaged by any one of the armatures when its respective solenoid has been de-energized and thus to move the color screen so as to move said one color section out of position and bring another color section in front of the light source, said armature urging means being sufficiently strong to overcome the color screen urging means, and said indicia being moved to a position in line with the light source and said color screen only in the de-energized condition of the solenoid whereby the particular armature which has caused said color screen to be moved may be identified.

THEODORE W. HALLERBERG.